H. J. S. GILBERT-STRINGER & P. W. DRUITT.
APPARATUS FOR COMPOSING AND CASTING TYPE.
APPLICATION FILED FEB. 12, 1910.

1,074,546.

Patented Sept. 30, 1913.

9 SHEETS—SHEET 1.

H. J. S. GILBERT-STRINGER & P. W. DRUITT.
APPARATUS FOR COMPOSING AND CASTING TYPE.
APPLICATION FILED FEB. 12, 1910.

1,074,546.

Patented Sept. 30, 1913.

9 SHEETS—SHEET 2.

Fig. 2.

H. J. S. GILBERT-STRINGER & P. W. DRUITT.
APPARATUS FOR COMPOSING AND CASTING TYPE.
APPLICATION FILED FEB. 12, 1910.

1,074,546.

Patented Sept. 30, 1913.

9 SHEETS—SHEET 4.

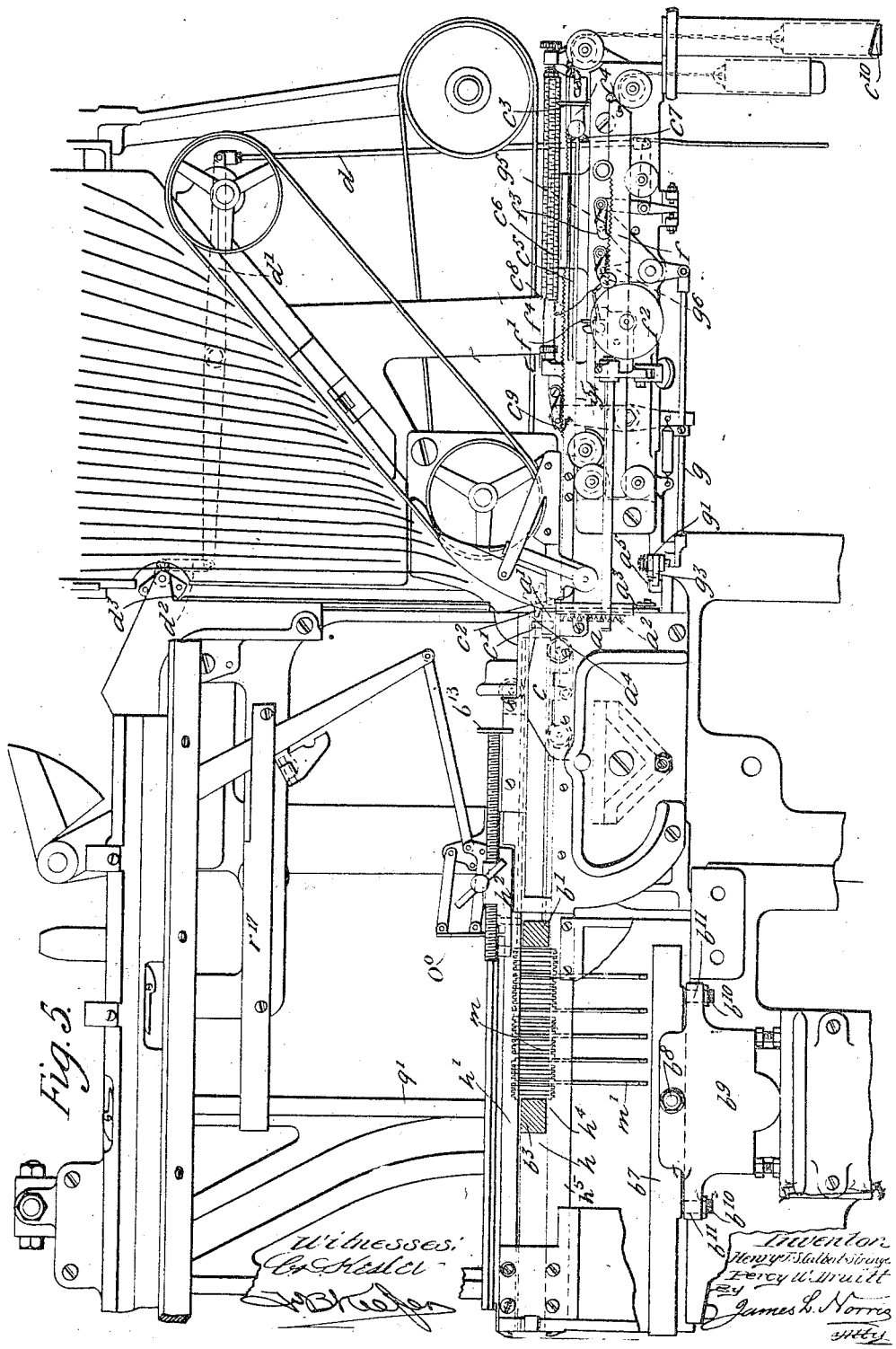

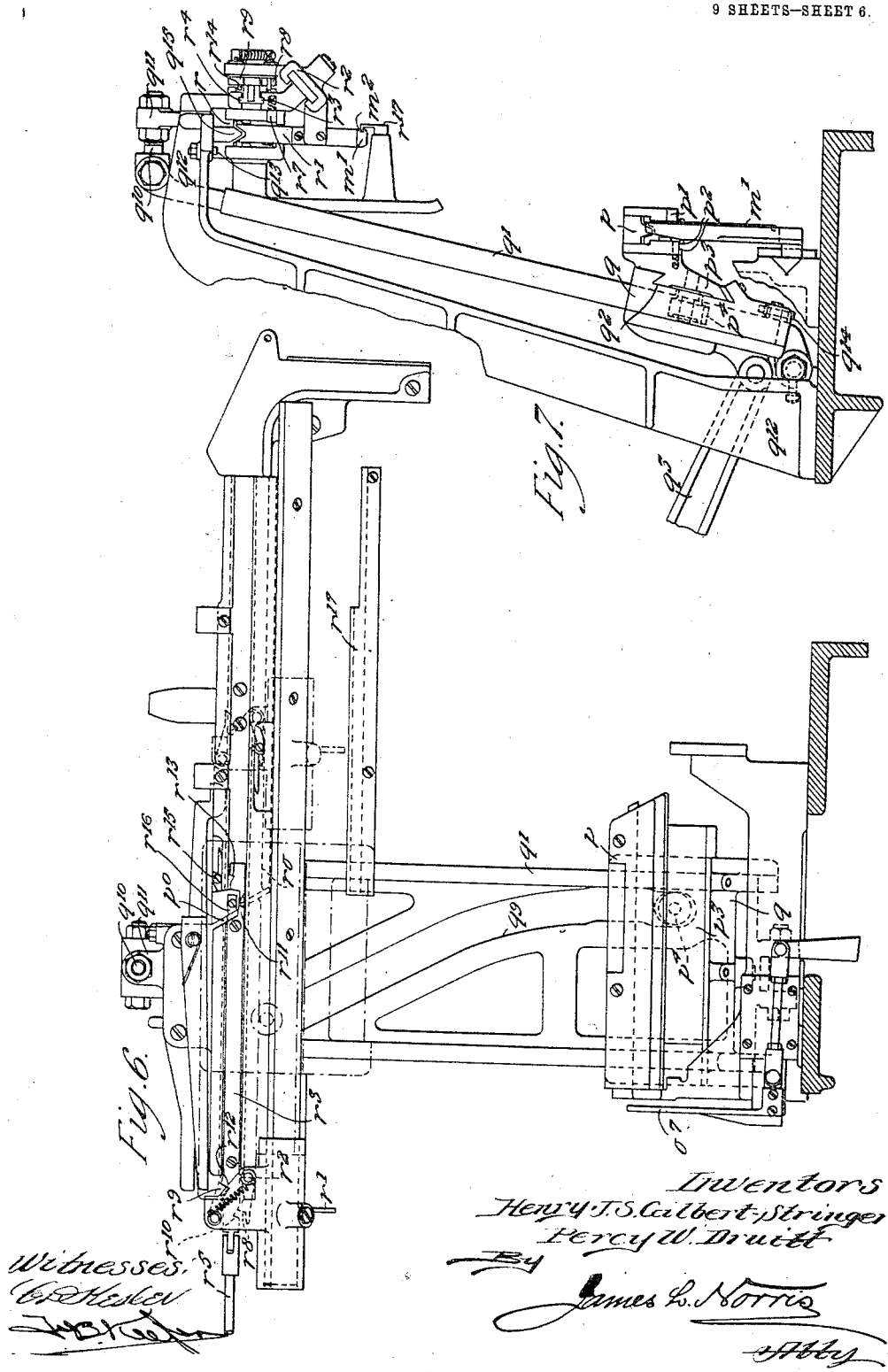

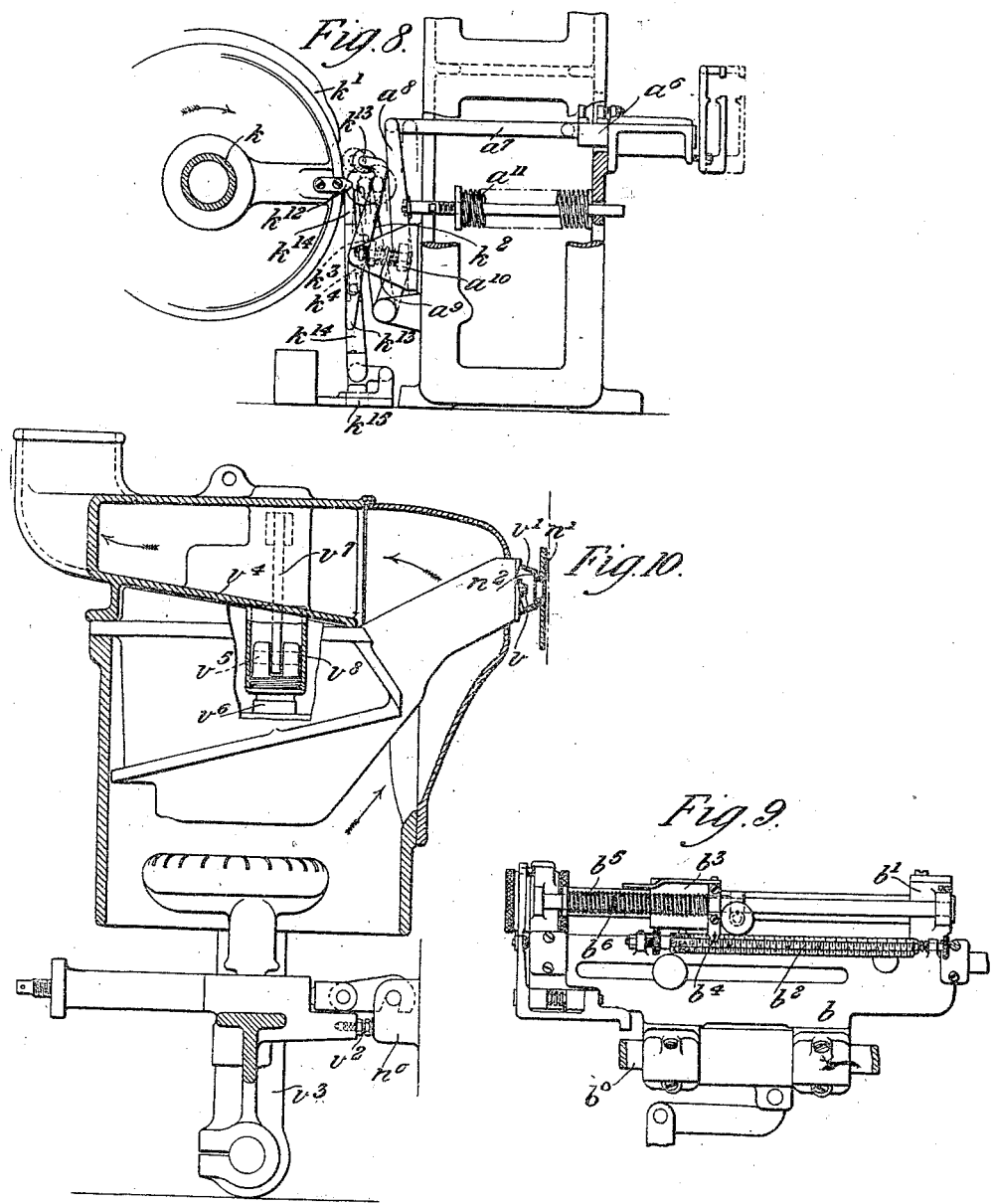

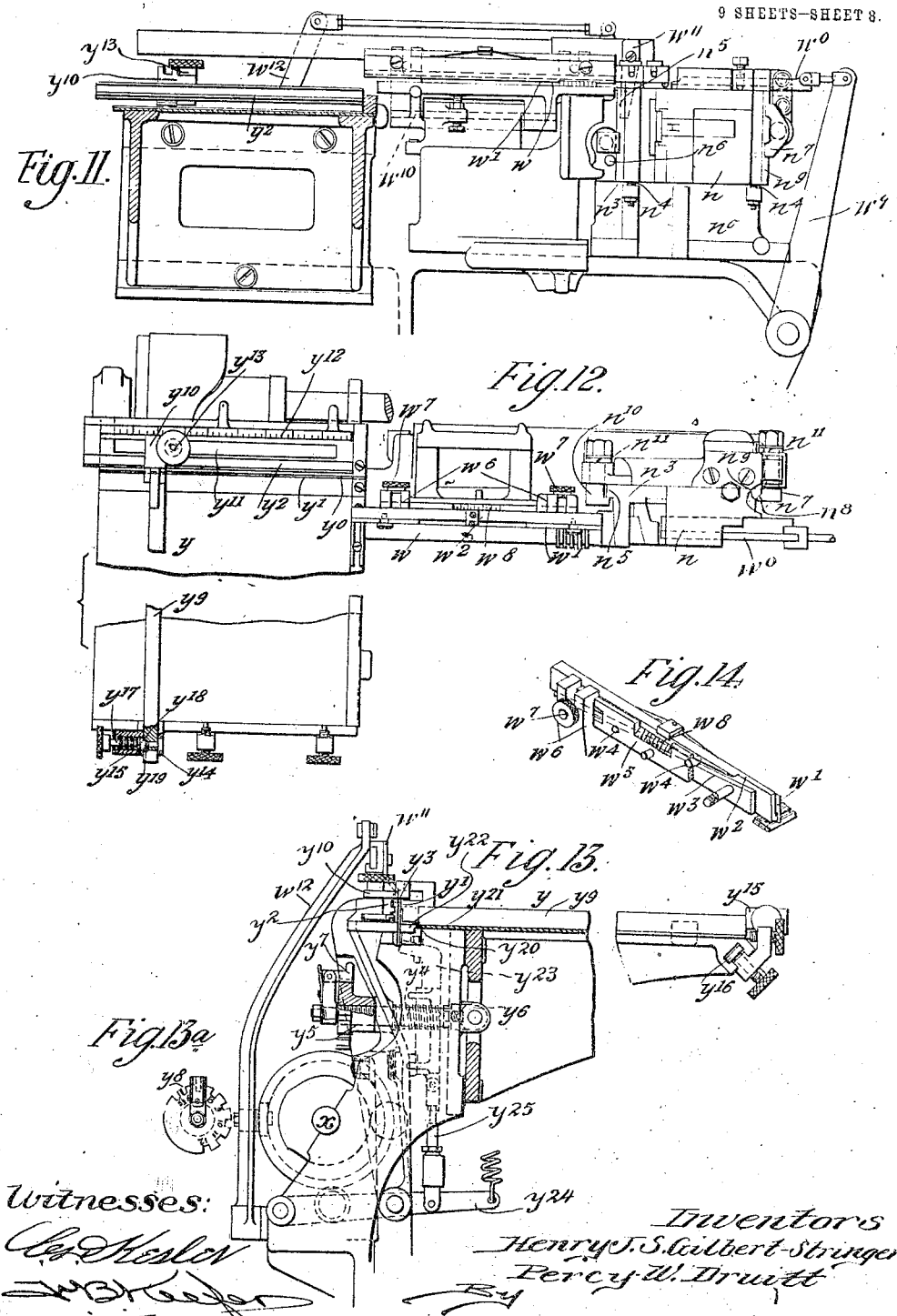

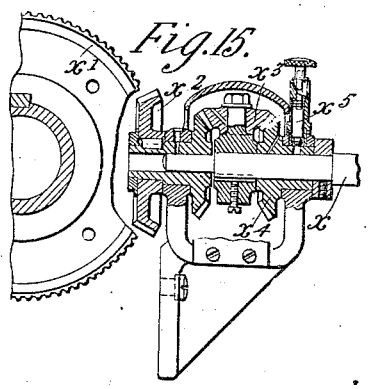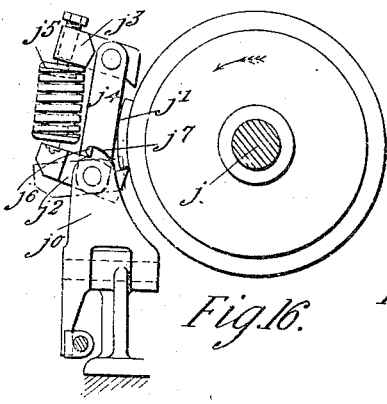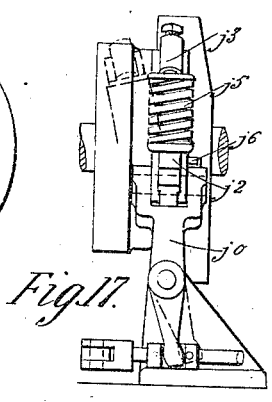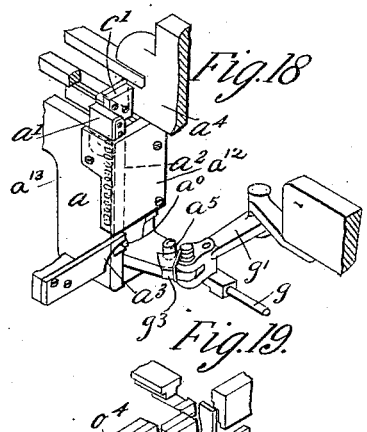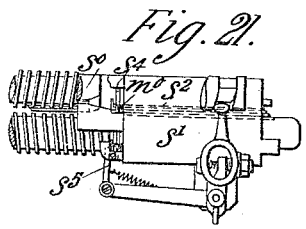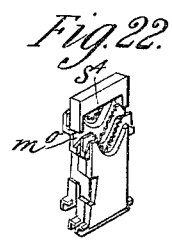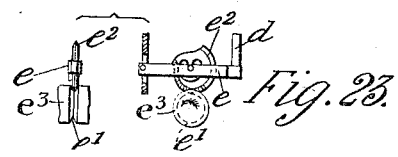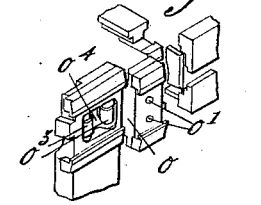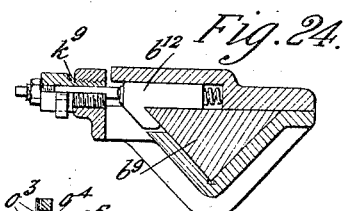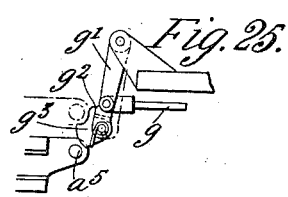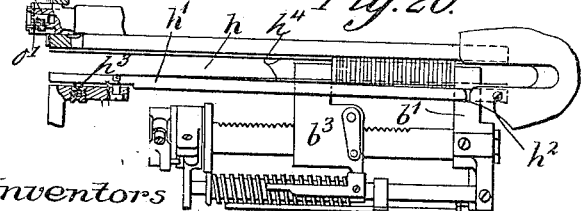

UNITED STATES PATENT OFFICE.

HENRY JAMES SYDNEY GILBERT-STRINGER, OF BRIGHTON, AND PERCY WALTER DRUITT, OF MITCHAM, ENGLAND, ASSIGNORS, BY MESNE ASSIGNMENTS, TO EDWARD HERON ALLEN AND ARTHUR FRANK DE FONBLANQUE, BOTH OF LONDON, ENGLAND.

APPARATUS FOR COMPOSING AND CASTING TYPE.

1,074,546.  Specification of Letters Patent.  Patented Sept. 30, 1913.

Application filed February 12, 1910. Serial No. 543,506.

*To all whom it may concern:*

Be it known that we, HENRY JAMES SYDNEY GILBERT-STRINGER, gentleman, and PERCY WALTER DRUITT, engineer, both subjects of the King of Great Britain, residing, respectively, at 4 Clifton road, Brighton, in the county of Sussex, England, and Baron Cottage, London road, Mitcham, in the county of Surrey, England, have jointly invented certain new and useful Improvements in Apparatus for Composing and Casting Type, of which the following is a specification.

The primary objects of this invention are to construct a machine for composing and casting type of the kind described in the specifications to British Letters Patent Nos. 1903 of 1900 and 15468 of 1906 which will be able to deal with type of any ordinary body and set up lines of any measure within considerable limits, and this without involving any appreciable delay in changing from one font of type to another or from one measure to another, and further to increase the certainty of action and the efficiency generally of such machines. Thus, in a machine actually constructed it has become possible by means of the improvements in construction hereinafter described to deal with type of any body between and including ruby and pica, and to set up lines of from 6 ems to 40 ems and these limits may even be exceeded.

Figure 1:
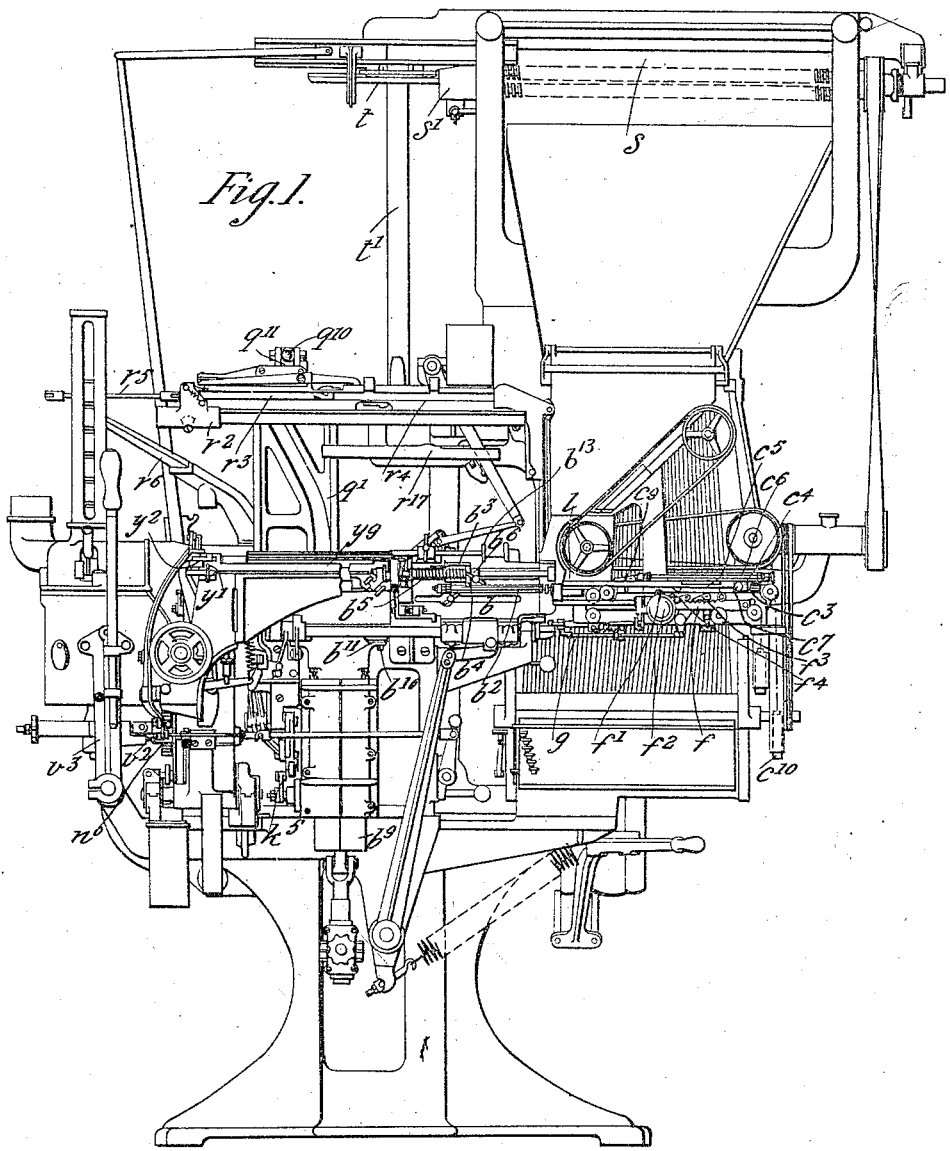
Figure 3:
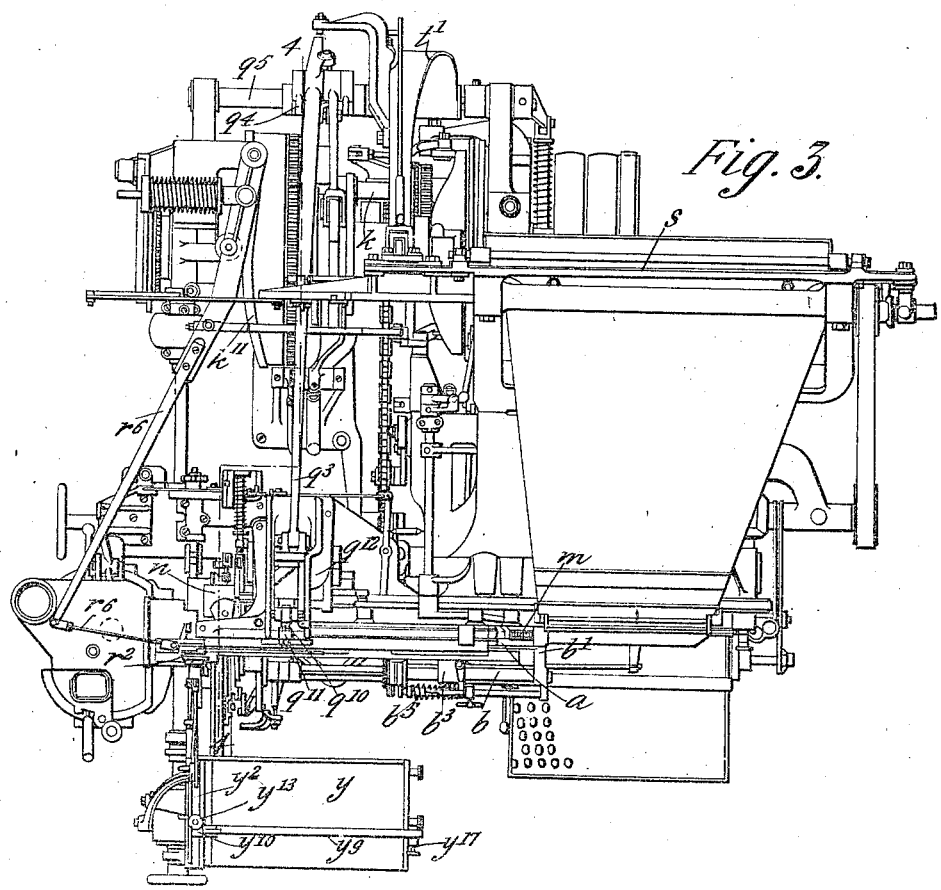

The various improvements which constitute the present invention will be referred to substantially in the order in which they come into operation in the use of the machine, and are illustrated in the accompanying drawings, in which:

Figure 1 is a front elevation of a machine for composing and casting type embodying the present invention. Fig. 2 is a side elevation. Fig. 3 is a plan view, Fig. 4 is a vertical transverse section on line 4—4 of Fig. 3, Fig. 5 a part front elevation on enlarged scale with justifying vise removed. Figs. 6 and 7 front and side elevations of another part showing the first elevator and the justifying space matrix distributing race, Fig. 8 a side elevation of another part showing the line shaft stop and driving mechanism of the assembling box, Fig. 9 a front elevation of the justifying vise, Fig. 10 a front elevation of another part (with part broken) showing the metal pot and pump, Fig. 11 an elevation of the mold and mold bracket and intermediate type race and section through galley, Fig. 12 a plan view of the same, Fig. 13 a transverse sectional elevation of galley, Fig. 13$^a$ an end elevation of the galley stop nut shown in Fig. 13. Fig. 14 a perspective view showing detail of adjustment of the intermediate race way, Fig. 15 a longitudinal section showing galley shaft driving mechanism, Figs. 16, 17, side and end elevations of the casting shaft stop, Fig. 18 a detail view (perspective) showing assembly box, Fig. 19 a perspective view of the mechanism for holding and guiding matrices during presentation and separation, Fig. 20 a sectional plan showing the mechanism shown in Fig. 19 and the justifying raceway, Fig. 21 a rear elevation of part of the machine showing the distributer box, Fig. 22 a perspective view showing the relation of the matrices during separation prior to hoisting to distributer bar, Fig. 23 side and end views of justifying space matrix releasing mechanism, Fig. 24 a section of justifying slide showing adjustable locking mechanism, Fig. 25 a detail showing the releasing mechanism for the pawls of the addendum apparatus.

The first of the improvements comprised in the present invention is to mount part of the front wall $a'$ of the assembly box $a$ (Figs. 3, 5, 18) with a certain vertical freedom which enables it, while normally urged by spring $a^2$ into the guiding position, to be automatically retracted by the engagement of a pin $a^6$ at the foot of the movable part of the wall $a'$ with a fixed cam device $a^3$ when the assembly box is shifted outward into alinement with the justifying raceway $h$ so as to provide the clearance necessary for the fixed jaw $b'$ of the justifying vise $b$ (Figs. 3 and 9) to return to its extreme right-hand position prior to closing over the matrices. The remaining part $a^{13}$ of the front wall is rigid with the end wall $a^{12}$ of the assembly box. The vise $b$ carrying the fixed jaw $b'$ and the movable jaw $b^3$ is slidably mounted on the longitudinal bar $b^6$ the ends of which are suitably journaled in the frame so that the vise can be oscillated about the axis of the bar $b^6$. When a line of matrices has been assembled the vise is slid to its extreme right hand position, the jaws being simultaneously opened by the engagement of the movable jaw $b^3$ with a stop $b^{13}$ longitudinally adjustable on the frame. The vise is then swung backward toward the assembly box, the jaws embracing the line of matrices and the movable jaw $b^3$, being released from engagement with the stop $b^{13}$, closing on the line to grip the matrices. The front edge of the rear guiding wall $a^4$ (Figs. 5 and 18) acts as a stop for the movable abutment $c$ against which the matrices are delivered and which has a projecting part $c'$ so positioned that it can approach close to the star wheel $c^2$ which thrusts the matrices forward in the assembly box. The rear wall $a^4$ is not mounted on the assembly box but on the fixed frame so that when the assembly box $a$ is shifted laterally outward the rear guide wall $a^4$ will not encounter the abutment $c'$, should there be no matrices in the assembly box.

Another improvement relating to the delivery of the space matrices to the assembly box $a$ is due to the fact that the space key has not only to actuate the usual mechanism for releasing the space matrices, viz. the link $d$ which is operated by the eccentric carriage $e$ (Fig. 23) in the usual way on depressing the space key, the lever $d'$, link $d^2$ and latch $d^3$, Fig. 5, but also through this releasing mechanism has to operate the addendum mechanism which determines and registers the excess thickness introduced into the line for justification, and it is found that the additional duty thus thrown on the actuating mechanism results in the rapid destruction of one of the elements of this mechanism, viz., a continuously rotating india-rubber roller $e^3$ through which the releasing mechanism is operated. To obviate this defect that part $e'$ (Fig. 23) of this roller which actuates the space matrix releasing mechanism is made of hard material such as vulcanized fiber and the contacting surfaces of the fiber roller and its coöperating cam device $e^2$ (Fig. 23) are grooved or V-shaped so as to increase the friction between them.

A pointer $c^3$ fixed on a carriage $c^4$ which is slidably adjustable on a bar $c^5$ extending rearwardly from the abutment $c$ (Figs. 1 and 5) is set with respect to a scale (one of a series of scales corresponding to different fonts of type and preferably formed on the sides of a polygonal bar $c^6$ rotatably mounted on the frame) to determine the measure of the line, and the indication to the operator that the correct measure has been reached is given by this pointer or an equivalent pointer on the same carriage being brought approximately into register with an index $f'$ carried by the addendum rod or rack $f$. His attention is called to the fact that he is approaching the limit of the line by means of a tripping device $c^7$ mounted on the carriage (preferably adjustably) which actuates a bell $f^2$ carried by the addendum rack. On the bell being sounded he completes the line with due regard to good spacing. In order to prevent backward movement of the abutment $c$ during the feeding of the character and space matrices the rearwardly extending bar $c^5$ has a fine toothed rack $c^8$ which coöperates with a pawl $c^9$ suitably mounted on the frame to prevent such backward movement. This pawl is released to allow the abutment $c$ to be returned by a weight $c^{10}$ or a spring to its initial position simultaneously with the release of the driving and locating pawls $f^3$, $f^4$ respectively of the addendum rack and by means of the same mechanism which is actuated by the return movement of the assembly box $a$ from the justifying to the assembling plane, viz. through pin $a^5$ carried by a lug on the assembly box engaging a spring urged latch $g^3$ (Figs. 5, 18, and 25), and forcing it against a stop $g^2$ on lever $g'$, thereby displacing lever $g'$ and rod $g$ toward the right, to shift the releasing cams $g^4$, $g^5$, $g^6$ (Fig. 5) which lift the various pawls $c^9$, $f^3$, $f^4$ out of engagement with their respective racks $c^8$ and $f$. The justifying raceway $h$ has two pairs of rails, an upper pair indicated at $h'$ and a lower pair indicated at $h^5$ (Fig. 5). The top front rail $h'$ (Figs. 5 and 20) of the upper pair of the two pairs of rails of the justifying raceway $h$ is hinged at $h^2$ at the end nearest the assembly box $a$ and spring urged at the other end by spring $h^3$ so as to exert pressure upon the leading matrices in transit from the justifying vise $b$ to the separating mechanism.

In order that the speed of the casting apparatus may conform more or less with the size of the type which is to be cast, a change speed gear $i'$ (Fig. 4) of a suitable character and number of steps is interposed between the clutch on the driving shaft $i$ through which the casting shaft $j$ is driven by the chain $i^2$ and sprocket $i'$ or other gear. By this means the speed at which the casting mechanism is driven may be varied to suit requirements without affecting the speed of the mechanism controlling or effecting the assembling and re-distribution of the matrices and the handling of the cast type.

The assembly box slide $a^6$ (Fig. 8), by which the assembly box is pushed outward from the position shown in full lines to the position shown in dotted lines in Fig. 8, thus bringing the line of matrices into the justifying position, is driven from the line shaft $k$, i. e. the shaft which effects the various movements of the line of matrices, through a link $a^7$ connected with a lever $a^8$ which is suitably fulcrumed on the frame and is actuated through a spring $a^9$ by means of a cam $k'$ on the line shaft acting through lever $k^2$, the spring being of sufficient strength to drive the lever under normal conditions and of sufficient range that in the event of stoppage it can absorb the full movement of the cam. In the preferred construction the spring is interposed between a lug $a^{10}$ at an intermediate point of the lever $a^3$ which is fulcrumed at its end and a similar lug $k^3$ on the lever or roller arm $k^2$ engaging the cam $k'$ and fulcrumed co-axially with the lever $a^3$, a bolt or other suitable adjustable link $k^4$ connecting the two lugs so as to limit adjustably the angle between the roller arm and lever. This spring drive also serves to insure that the assembly box $a$ will always be in proper alinement with the justifying raceway $h$ in the forward position of the assembly box, which is returned by means of a spring $a^{11}$ to its initial position in register with the assembler $l$ (Figs. 1 and 5) by which the matrices are fed from the magazines into the assembly box.

The justifying vise $b$ (Figs. 1, 3, 9) is constructed and operated substantially as described in the specification to British Letters Patent No. 15468 of 1906, but in order to make provision for different fonts and measures it is fitted with a series of scales $b^2$, corresponding with those applied to the abutment in the assembly box, which coöperates with an index $b^4$ on the movable jaw $b^3$ of the vise. Moreover, the spring $b^5$ which closes the movable jaw on to the line of matrices $m$ (Fig. 5) is mounted on a sleeve $d^6$ which can be adjusted and clamped in any desired longitudinal position on the vise so that the required pressure on the movable jaw $b^3$ may be maintained independently of the measure of the line.

The bar $b^7$ (Fig. 5) under the justifying race-way $h$ on which, when partly elevated, the justifying space matrices $m'$ rest, is mounted so that it may be set accurately parallel with the ways $h^4$ on which the matrices $m$ rest and this is preferably effected by pivoting the bar $b^7$ at an intermediate point $b^8$ on the justifying slide $b^9$ (Figs. 1 and 5) and adjusting the arms of the bar $b^7$ for parallelism by means of set-screws $b^{10}$ screwed into lugs $b^{11}$ on the slide and abutting on the lower surface of the bar more or less near the two ends.

The justifying slide $b^9$ is locked between a fixed guide $b^0$ and a movable clamp $b^{12}$ after the justifying space matrices $m'$ have been expanded and before the vise $b$ is released substantially in the manner described in the specification above mentioned, but provision is made for insuring that the slide $b^9$ will be locked within a definite range of angular movement of the crank $k^5$ which is operated through pitman $k^6$, cam lever $k^7$ and cam $k^8$ by line shaft $k$, and which actuates the screw threaded locking pin $k^9$ (Figs. 1, 4 and 24), and this is preferably accomplished by making the locking pin of variable length so that its initial distance from the coöperating member $b^{12}$, which constitutes the movable or clamping part of the housing of the slide $b^9$, may be adjusted.

The line of matrices after justification is advanced to the separating position where the matrices are separated out one by one and advanced to close the mold, all as described in United States patent specification No. 675,829. It will be sufficient for the understanding of the present invention to point out that the justified lines of matrices are urged toward the casting position by a gravity-driven pusher $o^5$ which, on being retracted, is raised into the position shown in Fig. 5. As the matrices $m$ reach the separation point they are sliced off one by one by a reciprocating separation plunger $o^2$ which pushes the matrices in succession in front of the presentation plunger $o$ by which each matrix in turn is urged outward to close the mold. It will be understood that the character matrices have the characters in intaglio on one of their sides.

To insure that the matrix $m$ will not alter its position while being advanced to close the mold $n$ (Figs. 3, 11, 12) and retracted therefrom the face of the presentation plunger $o$ (Figs. 4, 19, 20) is provided with spring urged plungers $o'$ which press the matrix forward in its guide flanges on the face of the plunger and by the friction thereby set up hold it firmly in its proper position and incidentally also prevent any tendency for the matrix to follow the retreating separating plunger $o^2$ (Fig. 4). Similarly the matrices, on being displaced by succeeding matrices after casting is effected, are pushed in front of the rollers $o^3$ mounted in a small carriage $o^4$ (Figs. 19, 20) which is urged forwardly by a spring $o^5$ so as to produce sufficient friction to prevent any tendency of the matrix to return and so interfere with the withdrawal of the succeeding matrices from the mold after casting.

The matrices after casting are brought together in the re-assembly box $p$ (Figs. 4, 6, 7) in the known manner, but as by the present invention this re-assembly box is given an endwise movement as well as a vertical sliding movement in being moved to the position in which the matrices are transferred to the second elevator, means are provided for preventing the endwise movement setting up a swing of the matrices about their points of support, such means consisting of a fixed member or wall $p'$ extending on one side along the length of the re-assembly box against which wall the character matrices $m$ and justifying space matrices $m'$ are pressed by an opposing spring urged slidable wall or member $p^2$. The endwise movement is given to the re-assembly box as it is raised to the position in which it coöperates with the elevator in order to bring it into alinement with the space matrix distributer race-way which is substantially vertically above the initial position of the assembly box thereby obviating any increase in the length of the lower part of the machine.

The re-assembly box $p$ (Figs. 1, 2, 4, 5, 6 and 7) is mounted on a device which will be distinguished as the first elevator as it operates to bring the re-assembly box into position to coöperate with the second elevator which withdraws the character and ordinary space matrices from the justifying space matrix distributing race-way $r$ and lifts them to the matrix distributing bar. The first elevator consists of a block or slide $q$ which is movable on a vertical or approximately vertical guide $q'$ and has itself a longitudinal guideway $q^2$ in which a slide $p^3$ integral with the re-assembly box $p$ is fitted. The elevator block $q$ is pivotally connected with an elevating lever $q^3$ (Figs 2, 3, 4 and 7) which is fulcrumed on the end of a radius rod $q^4$ turning on a fixed pivot $q^5$. An arm $q^6$ fulcrumed co-axially with the elevating lever $q^3$ carries at its free end a roller $q^7$ which bears on a cam $k^{10}$ on the line shaft $k$ the rotation of which effects and controls the movements of the line of matrices. The movement of this roller arm $q^6$ is conveyed to the elevating lever $q^3$ through a spring connection $q^8$ between the arm and the lever so as to obviate breakage in the event of jamming or interruption and also insure the due alinement of the re-assembly box in its elevated position with the justifying space matrix distributing race-way $r$. The endwise movement of the re-assembly box is effected by means of a roller $p^4$ (Figs 6 and 7) on the re-assembly box $p$ engaging in a suitably inclined or curved guideway $q^9$ thereby moving the longitudinal slide $p^3$ of the re-assembly box $p$ in its guideway $q^2$.

Provision is made for adjusting the first elevator $q$ and the guide $q'$ on which it is mounted so that the re-assembly box will in its lower operative position be in due alinement with race-way $o^6$ along which the matrices are moved by the re-assembly plunger $o^7$ (Figs. 4 and 6) and in its upper position with the space matrix distributing raceway $r$. For this purpose in the preferred construction the upper end of the guide $q'$ is pivotally connected with a bolt $q^{10}$ (Figs. 1, 2, 3, 4, 6 and 7) which is longitudinally adjustable in a lug $q^{11}$ integral with a fixed bracket $q^{12}$ thereby enabling the upper end of the guide to be adjusted in a transverse direction, and the lower end of the guide $q'$ is clamped to the lower end of the fixed bracket $q^{12}$ in such manner as to enable it to be adjusted transversely also. An adjustable stop $q^{13}$ is provided on the upper part of the fixed bracket $q^{12}$ or alternately on the upper end of the guide or of the elevator block to determine the upper limit of the movement of the re-assembly box $p$, a similar adjustable stop $q^{14}$ being provided to determine its lower limiting position. The upper bracket is fitted with a block $q^{15}$ which is shaped on its lower side to conform with the upper ends of the justifying space matrices $m'$ so that when the re-assembly box $p$ is brought by the first elevator into its upper position any space matrix which is not properly suspended in the re-assembly box will be forced down into its proper position therein.

The line of matrices is removed from the re-assembly box $p$ by means of an abutment plate or block $r'$ (Figs. 2, 4, 6 and 7) which transfers them to the justifying space matrix distributing raceway $r$, and in order that this and the subsequent transference of the justifying space matrices $m'$ to their magazine may be effected conveniently these movements are carried out in stages as hereinafter described. The abutment carriage $r^2$ (Figs. 1, 2, 4, 6 and 7) is shifted by means of a slide $r^3$ moving in longitudinal guideways $r^4$ and actuated through suitable linkage, for example connecting rod $r^5$ and cam lever $r^6$ (Figs. 1, 2, 3) by means of a cam $k^{11}$ on the line shaft $k$ (Fig. 3) in the usual manner, but the slide $r^3$ and carriage $r^2$ are so correlated that for the first of the two stages of the forward movement of the carriage the slide travels forward and back again. At this stage the matrices $m$ are removed by the second elevator in the usual manner. On the next forward movement of the slide $r^3$ the carriage $r^2$ drives the justifying space matrices $m'$ into their magazine and on the ensuing backward movement the slide retracts the carriage to the intermediate position shown in dotted lines in Fig. 6. The slide is then again moved forward independently of the carriage and on its return movement retracts the carriage to its initial position shown in full lines in Fig. 6 ready to receive the next line of matrices. A spring controlled strip $r^7$ is inserted in one wall of the justifying space matrix distributing raceway $r$ to exert pressure on the leading matrices to prevent swinging of the space matrices in the raceway and insure smoothness of transfer. In the preferred construction by means of which these movements are effected the carriage $r^2$ is fitted with two pawls one $r^8$ (Figs. 6 and 7) for effecting the forward movement and the other $r^9$ the rearward movement. Each of these pawls coöperates with a separate pair of notches $r^{10}$, $r^{11}$ and $r^{12}$, $r^{13}$ in the slide $r^3$, one at each end thereof. Thus in the first part of the forward movement of the carriage one of the pawls $r^8$ engages the rear notch $r^{10}$ of one of the pairs of notches on the slide. The return movement of the slide brings the front notch $r^{11}$ of the pair into operative relation with the pawl $r^8$ so as to effect the second stage of the forward movement of the carriage. Similarly in retracting the carriage the other pawl $r^9$ coöperates first with the front notch $r^{13}$ of the other pair of notches for effecting the first stage of the return movement and with the rear notch $r^{12}$ during the second stage. The pawls and notches are so related that when one pawl is in a notch the other pawl rests on a plain part of the slide. In the first stage of the forward movement of the carriage a projection $r^{14}$ on the inoperative pawl passes over an inclined stop $r^{15}$ on the frame and drops in front of it so as to prevent the carriage being moved rearward frictionally during the return stroke of the slide $r^2$. On the return movement of the carriage this pawl, being now dropped into the coöperating notch on the slide passes under the stop $r^{15}$.

Owing to the simultaneous endwise and vertical movements of the re-assembly box $p$ in being brought into alinement with the justifying space matrix distributing race-way $r$ the adjacent ends of the box and race-way have to be beveled, and since the space matrices are supported by their upper lugs in the re-assembly box and by their lower lugs in the distributing race-way, it is necessary to provide means for supporting them during the interval when the upper lugs are cleared from the re-assembly box and the lower lugs engage with the rails $r^6$ of the distributing race-way, and this temporary support is afforded by plates $r^{16}$ in the race-way in line with the supporting rails or ledges $p^6$ of the re-assembly box.

To insure that the justifying space matrices will not be picked up by the second elevator which lifts the other matrices to the distributer bar $s^0$ (Fig. 21), their lower ends have notches $m^2$ (Fig. 7) in their edges which engage a rail or rib $r^{17}$ (Figs. 1, 2, 4, 5, 6 and 7) extending longitudinally parallel with the justifying space matrix distributing race-way.

The distributer $s$ (Figs. 1 and 3) to which the matrices are transferred and the second elevator $t$ (Fig. 1) by which they are lifted together with its safety device enabling the line shaft to be disconnected are of known character, but an improvement is now effected in which the second elevator lever $t'$ (Figs. 2 and 4) is pivoted co-axially with the radius rod $q^4$ on which the first elevator lever $q^3$ is fulcrumed and a lateral projection $t^2$ on the cam lever $t^3$ which actuates the second elevator lever $t'$ is fitted with an adjustable stop $t^4$ which coöperates with the first elevator lever $q^5$ in such manner that should the re-assembly box $p$ fail to rise from its lower position the second elevator cam lever $t^3$ will be arrested thereby preventing the second elevator $t$ leaving the distributer box $s'$ (Figs. 1, 21) and thus bringing into action the safety device above referred to and stopping the machine. In order to prevent more than one matrix being simultaneously transferred from the notched bar $s^2$ in the distributer box $s'$ to the distributer bar $s^0$ by the action of the usual oscillating plunger $s^3$, a gage $s^4$ (Figs. 21, 22) is interposed in the path of the matrices between the distributer box $s'$ and the distributer bar $s^0$, which gage enables one matrix to pass but arrests a second matrix presented simultaneously with the first by engagement with the ear $m^9$ of the said second matrix the thickness of the ears of the various different matrices being such that the greatest is less than twice the thickness of the smallest.

As described in British Letters Patent specification No. 15468 of 1906 the line shaft $k$ (Figs. 4 and 8) is unclutched from the driving shaft $i$ just prior to and during the casting operation by means of a stud or finger $k^{12}$ rotating with the line shaft which displaces a lever $k^{13}$ and thereby withdraws the latches as described in the above mentioned specification and permitting the clutch which couples alternatively the line shaft and casting shaft with the driving shaft to be automatically shifted into the position in which the casting shaft is coupled. As the improved machine is intended to be run at a greater speed than hitherto, provision is made for arresting the line shaft positively when this action occurs. This is effected by means of a stop lever $k^{14}$ which is so correlated with the latch releasing lever $k^{13}$ as by a pin and slot connection that when the latter is displaced by the stud or finger $k^{12}$ the end of the stop lever is simultaneously brought into the path of the stud as shown in Fig. 8 or other suitable projection and thereby arrests the line shaft $k$. The stop lever is preferably fulcrumed at its lower end on a block of lead $k^{15}$ or other similar material with the object of preventing rebound of the line shaft when the stop comes into operation.

In British Letters Patent specification No. 15468 of 1906 a device is described which operates on the completion of the casting of a line to disconnect the casting shaft from the driving shaft. According to the present invention a supplementary device is provided to prevent over-running of the casting shaft and associated mechanism when the casting shaft is unclutched. This consists of a spring buffer stop which is pivotally mounted on a lever $j^0$ (Figs. 4, 16, 17) fulcrumed on the frame and adapted to be shifted by suitable means simultaneously with the unclutching of the casting shaft so as to bring the buffer stop into the path of a stud or projection $j'$ on one of the cam disks on the casting shaft $j$. The buffer stop consists of a pair of opposed buffer arms or levers one of which $j^3$ is pivoted on the free end of the lever $j^0$ and the other $j^2$ is pivoted on a link or frame $j^4$ which itself is pivotally mounted on the lever $j^0$ co-axially with the arm $j^2$. Between the outer ends of the buffer arms is interposed a strong spring $j^5$. When the stud $j'$ in its rotation encounters the first arm $j^3$ it thrusts it aside and with it the frame $j^4$ which turns freely outward upon its pivot. The normal position of the second buffer arm $j^2$ is as shown in dotted lines in Fig. 16. In this position the arm $j^2$ is encountered by the stud $j'$, the spring $j^5$ is further compressed and the frame $j^4$ and buffer arm $j^3$ return to the position shown in Fig. 16 which position is determined by a pin $j^6$ on the frame $j^4$ being arrested by a stop $j^7$ on the lever $j^0$. In this position the arm $j^3$ arrests rebound of the shaft $j$.

In the casting apparatus, the sheath $v'$ (Fig. 10) encircling the pump nozzle $v$ instead of being pressed tightly against the back or cone plate $n'$ of the mold as has been the practice hitherto is arrested just in contact with or preferably just clear of the mold by means of a stop $v^2$ (preferably adjustable) on the pump swinging frame $v^3$ co-operating with an abutment on the mold bracket $n^0$ or other suitable part of the apparatus. In order that the surplus metal should not leak past the clearance between the nozzle sheath $v'$ and cone plate $n'$ the latter is formed with a protuberance $n^2$ encircling the coned aperture and projecting a short distance into the nozzle sheath.

The gases from the heating burner after being led around the nozzle in the known manner are returned over the top of the pot to heat the surface of the metal as shown by the arrows in Fig. 10, and in order to prevent oxidation or other chemical reaction between the gases and the molten metal a metal partition $v^4$ is interposed to form a closed flue for the gases. To prevent the pivot joint $v^5$ between the pump plunger $v^6$ and the connecting rod $v^7$ being clogged with dross from the melted metal, the joint is inclosed within a sleeve $v^8$ which is screwed over the end of the plunger and extends some distance above the level of the metal. In order to prevent damage due to starting the pump when the metal is solid and also to provide a means for adjusting the pump to give the precise impulse necessary with this apparatus to produce perfect type, a spring $v^9$ (Fig. 2) is interposed between the actuating cam lever $v^{10}$ and the lever and rocking beam $v^{11}$ which is coupled to the pump connecting rod $v^7$, and means such as nut $v^{12}$ are provided for adjusting the tension of the spring.

As the mold has to be changed for each change of type body it becomes necessary to provide means by which such interchange may be quickly and accurately accomplished, and this is done by supporting the lower edge of the angle plate $n^3$ of the mold $n$ (Figs. 11, 12) on the ends of vertical set screws $n^4$ in the mold bracket $n^0$ which are adjusted once for all for horizontality of the mold. The angle plate is made with flanges at the two ends one of which $n^5$ is square and abuts against a round stop $n^6$ projecting from the mold bracket being urged up against the stop by the action of a clamping bolt $n^7$ with an inclined face $n^8$ which is drawn tight against the correspondingly inclined edge of the other flange $n^9$ on the angle plate. The square flange $n^5$ is also clamped to the mold bracket by means of a suitable clamping bolt $n^{10}$, and preferably spring washers $n^{11}$ are interposed between the mold bracket and the nuts on the two bolts.

When the types are cast they are raised in succession by means of the mold cross slide, operating in the well known manner, to a position from which they are pushed laterally by means of a plunger $w^0$ (Figs. 11 and 12) connected with a cam-driven lever $w^9$, by means of which they are assembled in a receiving race-way $w$ (Figs. 11, 12, 14) in which they are gripped by a spring urged bead $w'$ or beads, engaging in nicks in the type. Since these beads should press the types with more or less equal force whatever font of type is being cast, they are mounted in a plate $w^2$ having a longitudinal but slightly inclined groove $w^3$ into which projects pins $w^4$ carried by a second plate $w^5$ which is slidable longitudinally in a guide $w^6$. Consequently when this second plate is moved one way or the other the plate $w^2$ carrying the bead or beads is vertically moved toward or from the type race-way. A clamp $w^7$ and scale $w^8$ are provided for setting the bead plate according to the size of type.

When the line of cast types is assembled in the raceway $w$, this raceway is swung through 90° upon the shaft $w^{10}$ (shown dotted in Fig. 11) so as to bring the type from a horizontal position into a vertical position in line with the space $y^0$ between the rule $y'$ and the front of the galley pusher $y^2$. The line of type is advanced from this position by a pusher $w^{11}$, operated by a cam-driven lever $w^{12}$, to a position in front of the galley pusher.

The galley shaft $x$ (Figs. 2 and 15) itself is driven through bevel gearing from the line shaft and as it has to rotate at the same speed as the latter but cannot practically be driven through equal gear wheels owing to exigencies of space available, it is necessary to drive through gear which increases the speed and then reduces again. In the preferred arrangement a two to one ratio is used in the bevel gearing $x'$ $x^2$ and the speed is again halved by interposing differential gear between the driven pinion $x^2$ and the galley shaft $x$, the intermediate pinion $x^3$ of the differential being fixed on the galley shaft. The outer pinion $x^4$ of the differential is normally fixed by a spring urged pin $x^5$ which can be withdrawn to enable the galley shaft $x$ to be rotated independently of the line shaft $l$ and thereby for example enable the last line cast to be transferred from the receiving race-way $w$ to the galley.

To provide for the accommodation of type of different body in the space $y^0$ between the rule $y'$ and the front of the galley pusher $y^2$ (Figs. 11, 12, 13 and 13ᵃ) which is driven forward in the usual manner to push the type $y^3$ into the galley $y$, the pusher is returned by means of a spring $y^4$ against a stop which is adjustable in position according to the type which is being handled. In the preferred construction the stop is a nut $y^5$ carried on a pivoted eye-bolt $y^6$ around which the returning spring is disposed. The edge of the nut is notched at intervals corresponding with the different type bodies and a pivoted latch $y^7$ carried by the bolt $y^6$ is adapted to engage these notches $y^8$ and lock the nut in a definite position. The rule $y'$ is mounted upon a carriage $y^{23}$ which is slidable vertically in guides on the galley support and is actuated by a cam-driven lever $y^{24}$ through an adjustable link $y^{25}$.

To adjust the galley for different measures the movable side stick $y^9$ is set by means of a block $y^{10}$ (Figs. 11, 12, 13) carried by the galley pusher $y^2$ and slidable in a guide $y^{11}$ extending lengthwise along the galley pusher, a scale $y^{12}$ and clamp $y^{13}$ being provided for setting and securing the block $y^{10}$ which thus acts both as an adjustable abutment on the galley pusher and a means for setting the movable stick. The other end of the movable stick is fitted in a groove $y^{14}$ in a block $y^{15}$ which is slidable in a guide $y^{16}$ in the galley bracket. The side stick is disconnectibly secured in this block by means of a spring urged pin $y^{17}$ fitted in the block and having an inclined or coned end $y^{18}$ which engages a similarly formed recess $y^{19}$ in the foot of the side stick $y^9$ so as normally to force the latter toward the head of the galley and against an abutment on the sliding block. By simply disengaging the pin the movable side stick can be drawn out of the galley.

To insure that there will be no obstruction to the passage of the lines of type as they are pushed into the galley the edge $y^{20}$ (Fig. 13) of the galley floor $y^{21}$ abutting against the fixed floor $y^{22}$ running along the head of the galley is beveled or chamfered to engage under the correspondingly beveled abutting edge of the fixed floor so that when the galley floor is pushed in its leading edge will be depressed until the surface of the movable galley floor is at least not above the level of the fixed part of the floor.

Having thus described the nature of our said invention and the best means we know of carrying the same into practical effect, we claim:—

1. In typographic machines, an assembly box movable laterally outward from the assembling position into alinement with the justifying position, said box having a front wall as one of its integral parts and said front wall having a vertically movable part normally urged upward into the operative position, and means operating to retract said movable part automatically when the assembly box is shifted laterally outward into alinement with the justifying position, substantially as described.

2. In typographic machines, an assembly box movable laterally outward from the assembling into alinement with the justifying position, said assembly box having a front wall and an end wall rigid therewith, and a rear guiding wall separate from the remainder of the assembly box and mounted upon the fixed frame, substantially as described.

3. In typographic machines, an assembly box movable laterally outward from the assembling position, a movable abutment against which matrices are delivered from the magazine, means for preventing backward movement of the abutment during the feeding of the matrices comprising a rack movable with the abutment and a pawl on the frame coöperating with said rack, means actuated by the outward movement of the assembly box to disengage the said pawl, a stop on the frame determining the normal rearward position of the abutment, and means operating automatically to return the abutment against said stop when the aforesaid pawl is disengaged.

4. In typographic machines, an assembly box movable laterally outward from the assembling position into alinement with the justifying position, a movable abutment for the matrices, means for preventing backward movement thereof, an addendum rod and rack and driving and locating pawls therefor, and means for releasing said abutment simultaneously with the release of said pawls, said means being actuated by the return movement of the assembly box.

5. In typographic machines, a justifying raceway comprising top and bottom pairs of rails whereof the front top rail is hinged at its rear end and horizontally spring-urged to exert pressure upon the leading matrices in transit along the raceway, substantially as described.

6. In typographic machines, a justifying vise having a movable jaw subject to the closing action of a spring a sleeve on which said spring is mounted, and means for adjusting the sleeve in any desired longitudinal position on the vise.

7. In typographic machines, a justifying race way and justifying slide, a bar below the race way pivotally mounted on the slide at an intermediate point and means for adjusting the level of the bar.

8. In typographic machines, a separating plunger operating to displace each matrix laterally in turn, a presentation plunger operating to advance the displaced matrices in turn to close the mold and having guides for the matrix on its face, and small spring-urged plungers mounted in the face of said presentation plunger and operating to press each matrix in turn forward in the guides and hold it firmly in position while being advanced to close the mold.

9. In typographic machines, a re-assembly box in which the matrices are brought together after casting, a second elevator to which they are transferred from the re-assembly box, means for moving the re-assembly box from one position to another by simultaneous endwise and vertical sliding movements and means for preventing the matrices swinging about their points of support during said movement.

10. In typographic machines, a substantially vertical fixed guide, a first elevator mounted to slide in said guide, a re-assembly box mounted to slide in said first elevator, an elevating lever and means actuated by a cam on the line shaft to actuate the elevating lever, substantially as described.

11. In typographic machines, a re-assembly box, a first elevator whereby the re-assembly box is shifted from one operative position to another, and means for insuring accurate registration of the re-assembly box with its coöperating devices in the said positions.

12. In typographic machines, means for transferring the matrices from the re-assembly box to their magazine comprising a carriage, a reciprocating slide for shifting carriage, actuated from the line shaft, said slide and carriage being so correlated that the full forward movement as also the full backward movement of the carriage is effected in two stages during each of which the slide is twice reciprocated.

13. In typographic machines, a matrix carriage, a reciprocating slide actuating said carriage and means for driving said slide and carriage, said means being adapted to move the carriage forward from its initial to an intermediate position in which the ordinary matrices are removed from the carriage, and subsequently to move the carriage again forward to drive the justifying space matrices into their magazines.

14. In typographic machines, justifying space matrices having notches in the edges of their lower ends, a justifying space matrix distributing raceway, and a rail extending longitudinally parallel with the said raceway and engaging in the said notches of the justifying space matrices, substantially as described.

15. In typographic machines, a first elevator for transferring the re-assembly box from its lower to its upper position, a second elevator by which the ordinary matrices are lifted from the matrix carriage, means for operating the first elevator, and means for operating the second elevator, the said latter means comprising an adjustable stop which coöperates with the means for operating the first elevator to arrest the second elevator actuating mechanism should the re-assembly box fail to rise from its lower position.

In testimony whereof we have signed our names to this specification in the presence of two subscribing witnesses.

HENRY JAMES SYDNEY GILBERT-STRINGER.
PERCY WALTER DRUITT.

Witnesses:
JOSEPH WILLARD,
WALTER J. SKERTEN.